United States Patent [19]
Suzuki et al.

[11] Patent Number: 6,014,207
[45] Date of Patent: Jan. 11, 2000

[54] VEHICLE LIGHTING UNIT

[75] Inventors: Tomonori Suzuki, Seto; Masachika Kamiya, Toyota, both of Japan

[73] Assignee: Toyota Jidosha Kabushiki Kaisha, Toyota, Japan

[21] Appl. No.: 09/116,664

[22] Filed: Jul. 17, 1998

[30] Foreign Application Priority Data

Jul. 24, 1997 [JP] Japan .................................. 9-198975

[51] Int. Cl.⁷ ...................................................... G01J 3/28
[52] U.S. Cl. .......................... 356/229; 356/230; 356/394; 315/77
[58] Field of Search .................................. 356/229, 230, 356/394; 315/77

[56] References Cited

U.S. PATENT DOCUMENTS 5,495,329   2/1996   Anderson, II et al. .................. 356/229

FOREIGN PATENT DOCUMENTS

A-5-147469   6/1993   Japan .

*Primary Examiner*—Robert H. Kim
*Assistant Examiner*—Reginald A. Ratiff
*Attorney, Agent, or Firm*—Oliff & Berridge, PLC

[57] ABSTRACT

When a vehicle enters into the lower portion of a shielding member, a headlamp is switched on, and a condition flag is set to Set 1 which represents a waiting state in which the vehicle exterior is estimated to become bright/dark intermittently. When the condition flag is set to Set 1, when the vehicle enters into the lower portion of the shielding member, the condition flag is set from Set 1 to Set 2 which represents an intermittent state in which the vehicle exterior becomes bright/dark intermittently with high possibilities. When the condition flag is set to Set 2, a switch-off extension time CFE and a switch-off delay time CTF make a time until the headlamp is switched off. As a result, the time until the headlamp is switched off is delayed, and the headlamp is required to remain switched on at portions where the vehicle exterior becomes bright/dark intermittently.

20 Claims, 5 Drawing Sheets

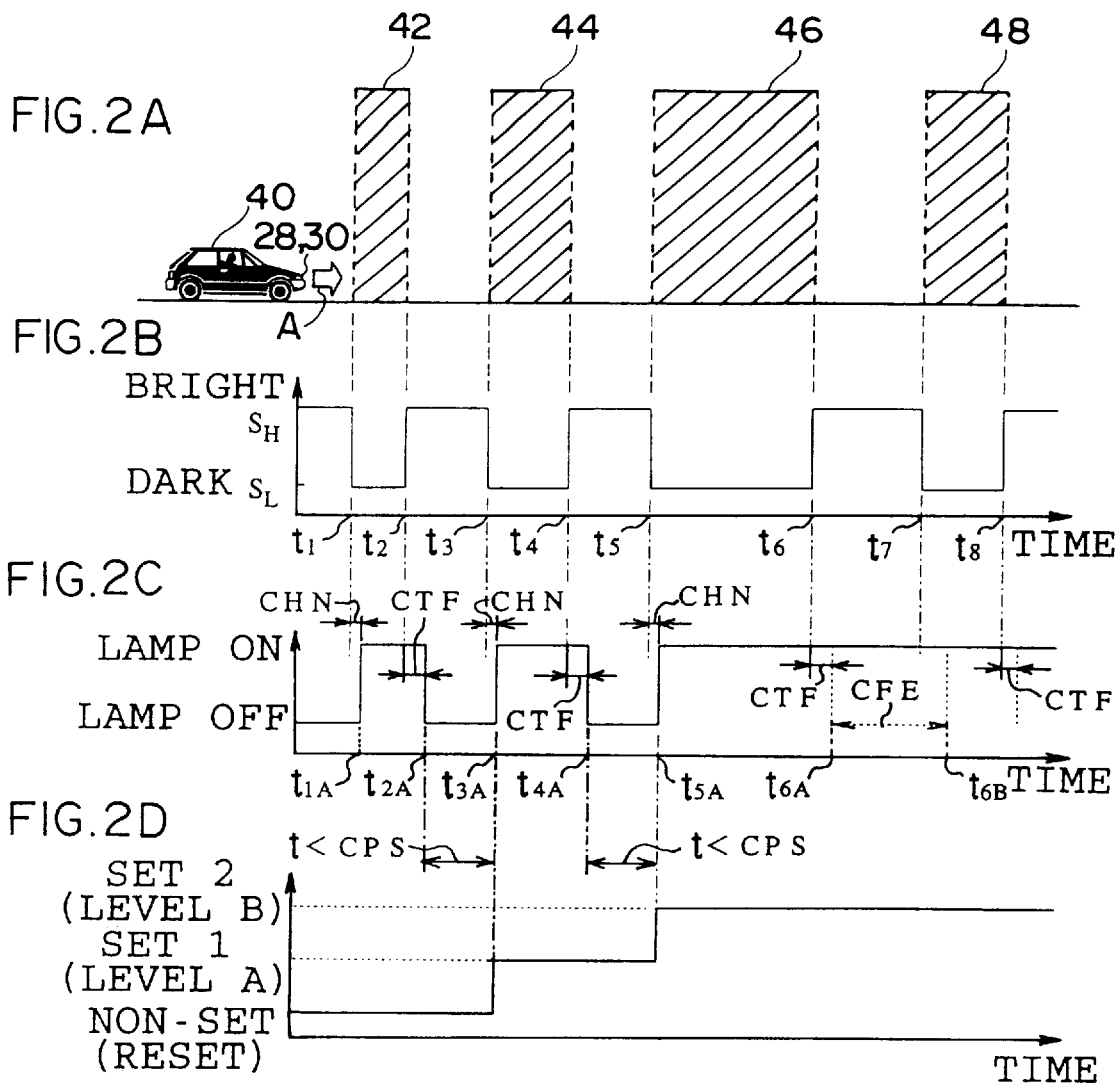

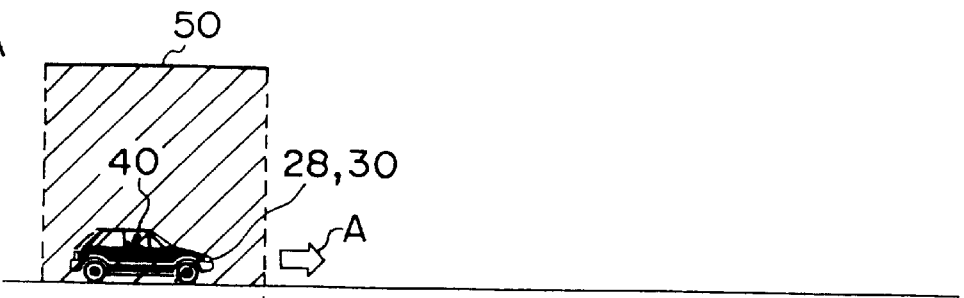
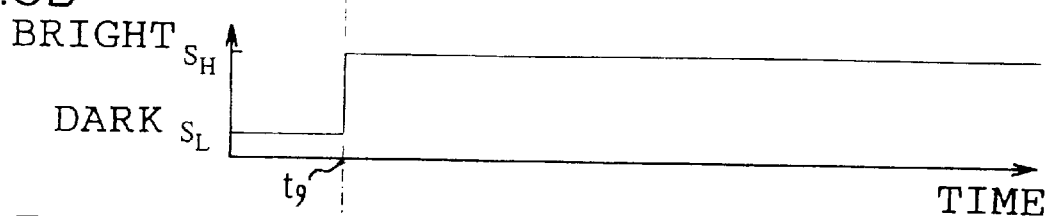
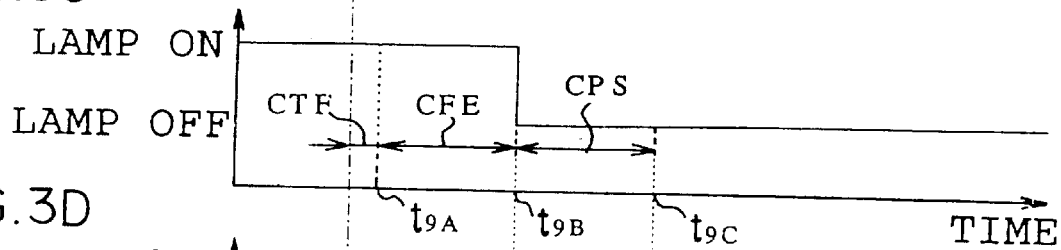
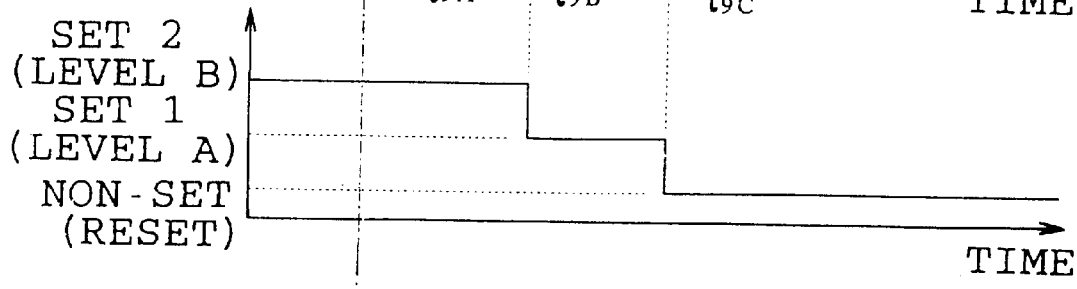
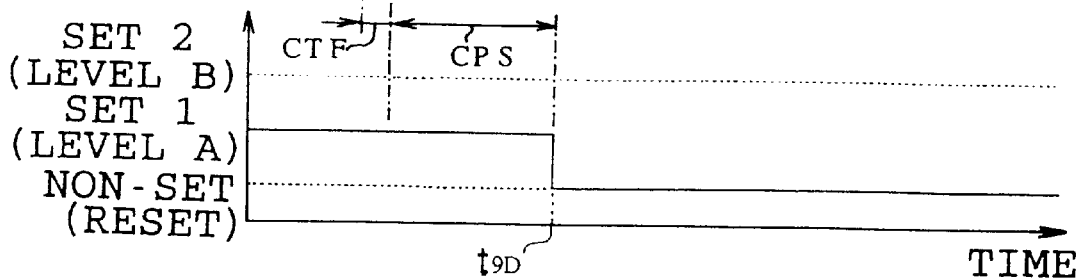

VEHICLE LIGHTING UNIT

BACKGROUND OF THE INVENTION

1. Field of the Invention

The present invention relates to a vehicle lighting unit, and more particularly to a vehicle lighting unit which controls a lighting unit such as a headlamp which illuminates the front of the vehicle, a tail-lamp or the like which is fixed to a vehicle.

2. Description of the Related Art

A headlamp is disposed at the front of the vehicle to improve the visibility of the front of a driver at night or the like. Further, in order to let other vehicles know the existence of the vehicle of the driver, tail lamps are fixed to the rear of the vehicle. Further, in order to improve the visibility of meters or the like for informing the driver of a vehicle speed or a fuel consumption at night or the like, the meter, or the like are illuminated. These illuminations are switched on/off by operating lighting (illumination) switches.

In recent years, in order to solve the annoyance involved with switching operation of the illumination switches, such a type of lighting unit as described below has been generalized. This lighting unit has an illumination sensor for metering the brightness of the vehicle exterior. The lighting unit judges whether or not the illumination value metered by the illumination sensor is equal to or less than a predetermined illumination value, and thereby judges whether or not the outside of the vehicle is dark. When the outside of the vehicle has been judged to be dark, headlamps or the like are switched on automatically.

If the value metered by the illumination sensor is equal to or less than a predetermined illumination value, when the headlamps are switched on automatically, there may be caused a problem as will be described below. Namely, in a case in which the vehicle exterior becomes bright/dark intermittently at a place such as a tunnel or the like or at the lower portion of a bridge beam or the like where lighting windows are disposed so as to be spaced apart from each other at a predetermined distance, because the vehicle exterior becomes light/dark intermittently, a headlamp or the like may be switched on/off. In this case, the switching on/off of the headlamp is carried out in a passing state.

In order to solve this problem, Japanese Patent Application Laid-Open (JP-A) No. 5-147469 discloses a headlamp light control apparatus in which, when the illumination value metered by the illumination sensor varies intermittently within a predetermined time, the switching on of the headlamp can be delayed.

However, in a prior art, because the switching on/off of the headlamp is delayed in the case in which the value metered by the illumination sensor varies intermittently within a predetermined time, when a vehicle has traveled at dark portions for a predetermined period of time or more, it means that a predetermined period of time has already passed. In this case, since the illumination value metered by the illumination sensor cannot be judged to vary within a predetermined period of time, the headlamp is switched off without delaying the switching-ON time. After the headlamp has been switched off, when the vehicle again enters into a dark portion, the headlamp is switched on immediately. Accordingly, because the time during which the lamp is switched off is very short, the driver may be annoyed with this.

SUMMARY OF THE INVENTION

In view of the aforementioned facts, it is an object of the present invention to provide a vehicle lighting unit which can illuminate the vehicle interior (Here, "the vehicle interior" means the inside of the entire vehicle body, not just the inside of the vehicle compartment)/the vehicle exterior without reducing the visibility of the driver when a vehicle is traveling at places where the brightness of the vehicle exterior varies intermittently.

The first aspect of the present invention is a vehicle lighting unit comprising: detecting means which detects the brightness of the exterior of a vehicle; and vehicle light which is mounted to the vehicle, and has a light source for illuminating at least one of the interior and the exterior of the vehicle; switching control means which switches on the vehicle light when the detected brightness of the vehicle exterior is equal to or less than a predetermined value, and which switches off the vehicle light when the detected brightness of vehicle exterior is more than the predetermined value; estimating means which estimates whether or not the brightness of the exterior of the vehicle which starts to travel is in an intermittent state, thereby requiring the vehicle light to remain switched on, on the basis of the variation of the detected brightness of the vehicle exterior; and prohibiting means which prohibits the vehicle light from being switched off when the brightness of the vehicle exterior has been estimated to be in the intermittent state by the estimating means.

The second aspect of the present invention is a vehicle lighting unit according to the first aspect of the present invention, wherein when the brightness of the vehicle exterior has been estimated not to be in the intermittent state by the estimating means, the prohibiting means cancels the prohibition of the switching off of the vehicle light.

The third aspect of the present invention is a vehicle lighting unit according to the first or second aspect of the present invention, wherein an ON state in which the vehicle light is switched on when the detected brightness of the vehicle exterior is equal to or less than a predetermined value, and an OFF state in which the vehicle light is switched off when the detected brightness of the vehicle exterior is more than a predetermined value are continually alternating so that a brightness pattern thereof is determined in advance, and the estimating means estimates whether or not the brightness of the vehicle exterior is in the intermittent state on the basis of the predetermined brightness pattern.

The fourth aspect of the present invention is a vehicle lighting unit according to the third aspect of the present invention, wherein the estimating means includes: setting means which sets a waiting mode in which the brightness of the vehicle exterior is estimated to be in the intermittent state, when the brightness of the vehicle exterior has a pattern in which the ON state is set for the first number of times or more within a predetermined time, and while the waiting mode is being set, which sets an intermittent mode when the brightness of the vehicle exterior has a pattern in which the ON state is set for the second number of times or more within a predetermined time so that the estimating means estimates the brightness of the vehicle exterior to be in the intermittent state when an intermittent mode has been set by the setting means.

The fifth aspect of the present invention is a vehicle lighting unit according to the fourth aspect of the present invention, wherein the setting means cancels the waiting mode when the brightness of the vehicle exterior moves to an OFF state and a predetermined waiting observation time has passed while in the waiting mode.

The sixth aspect of the present invention is a vehicle lighting unit according to the fourth aspect of the present invention, wherein the setting means cancels the intermittent mode and sets the waiting mode, when the brightness of the vehicle exterior moves to an OFF state due to the variation thereof and a predetermined waiting observation time has passed while in the intermittent state.

The seventh aspect of the present invention is a vehicle lighting unit according to any of the first to the sixth aspects of the present invention, wherein the light source is a discharging light.

The detecting means according to the first aspect of the present invention detects the brightness of the vehicle exterior. The switching control means switches on the vehicle light when the detected brightness of the vehicle exterior is less than or equal to the predetermined value, and switches off the light when the detected brightness of the vehicle exterior is more than or equal to the predetermined value. The vehicle light is mounted to the vehicle and has a light source for illuminating al least one of the interior or the exterior of the vehicle. A light source for illuminating the vehicle interior includes a light source which can improve the visibility of meters which are used to inform the driver of a vehicle speed or a fuel consumption. A light source for illuminating the vehicle exterior includes headlamps, fog lamps or the like which can improve the visibility of the vehicle front portion, and tail lamps which are disposed at the front and rear portions of the vehicle and inform other drivers of the existence of the vehicle.

The brightness of the vehicle exterior varies at the lower portion of the bridge beam or roads on which a plurality of tunnels are provided continually. On the basis of the variation of the brightness of the vehicle exterior, the estimating means estimates whether the brightness of the exterior of the vehicle which starts to travel is in an intermittent state, thereby allowing the vehicle light to remain switched on. At the lower portion of the bridge beam or roads on which a plurality of tunnels are provided continually, the vehicle exterior becomes bright/dark intermittently. In this way, at places where the vehicle exterior becomes bright/dark intermittently, the continuous switching on of the vehicle light by repeating the switching on/off of the vehicle light can prevent the annoyance involved with the switching control so that the visibility of the driver can be improved. If the outside of the vehicle becomes bright/dark intermittently, the estimating means estimates that the brightness of the exterior of the vehicle which starts to travel may be in an intermittent state in which the vehicle light is required to remain switched on. When the brightness of the vehicle exterior has been estimated to be in an intermittent state by the estimating means, the prohibiting means prohibits the vehicle light from being switched on by the switching control means.

Accordingly, even if the vehicle travels at the lower portion of a bridge beam or on a road on which a plurality of tunnels are provided continually, the switch-off time is not shortened, and the driver does not feel annoyance involved with switching operation.

As described above, in accordance with the first aspect of the present invention, on the basis of the variation of the brightness of the vehicle exterior, an intermittent state in which the vehicle light is required to remain switched on is estimated by the estimating means. When the brightness of the vehicle exterior has been estimated to be in an intermittent state, since the prohibiting means prohibits the switch-off of the vehicle light, the annoyance involved with the switching control can be prevented, and the switched off time is not shortened so that the visibility of the driver can be improved.

Even in the case in which the prohibiting means prohibits switching off of the vehicle light, in the same manner as the second aspect, if the brightness of the vehicle exterior has been estimated not to be in the intermittent state by the estimating means, the prohibiting means may cancel the prohibition of the switch off of the vehicle light. As a result, the switching control means can move to the switching on/off which is an ordinary switching control.

In accordance with the second aspect of the present invention, when the brightness of the vehicle exterior has been moved from the intermittent state, since the prohibiting means can cancel the prohibition of the switch off of the vehicle light, the switching control means can move to the switching on/off which is an ordinary switching control.

When the estimating means estimates whether the brightness of the outside of the vehicle which starts to travel is in an intermittent state on the basis of the variation of the brightness of the vehicle exterior, in accordance with the third aspect of the present invention, an ON state in which the vehicle light is switched on when said detected brightness of the vehicle exterior is equal to or less than a predetermined value, and an OFF state in which the vehicle light is switched off when the detected brightness of the vehicle exterior is more than a predetermined value are continually alternating so that the brightness pattern thereof is thereby determined in advance, and the estimating means estimates whether or not the brightness of the vehicle exterior is in the intermittent state on the basis of the predetermined brightness pattern. Namely, the vehicle light is switched on/off, and on the basis of a predetermined brightness, the vehicle light is set in an ON state or an OFF state. The ON/OFF state is continually alternating. As described above, when the brightness of the vehicle exterior varies on a road on which a plurality of tunnels are provided successively, or the like, the brightness pattern is determined as a brightness pattern for representing the intermittent state of the brightness of the vehicle exterior. Then, the brightness pattern resulting from the detected brightness of the vehicle exterior is compared with a predetermined brightness so that the estimating means is facilitated to estimate whether the brightness of the outside of the vehicle which starts to travel is in an intermittent state in which the vehicle light is switched on.

In accordance with the third aspect of the present invention, because an ON state in which the vehicle light is switched on when the detected brightness of the vehicle exterior is equal to or less than a predetermined value, and an OFF state in which the vehicle light is switched off when the detected brightness of the vehicle exterior is equal to or more than a predetermined value are continually alternating so that the brightness pattern thereof is thereby determined in advance, and the estimating means can easily estimate whether or not the brightness of the outside of the vehicle which starts to travel is in an intermittent state in which the vehicle light is required to remain switched on.

In accordance with the fourth aspect of the present invention, the estimating means includes setting means, and can estimate that the vehicle exterior is in an intermittence state when the intermittent mode is set by the setting means. The setting means sets a waiting mode in which the brightness of the vehicle exterior is estimated to be in the intermittent state, when the brightness of the vehicle exterior has a pattern in which the ON state is set for the first number of times or more within a predetermined time. While in the waiting mode, the setting means sets an intermittent mode when the brightness of the vehicle exterior has a pattern in which the ON state is set for the second number of times or more within a predetermined time. In this way, when the ON state is set for the first number of times or more, i.e., twice or more, the setting means sets a waiting mode so that a fixed brightness pattern in which the brightness of the vehicle exterior becomes bright/dark once or the ON state is not needed to remain can be removed, and the brightness pattern can be set reliably at the waiting portions in which the brightness of the vehicle exterior can be estimated to be in an intermittent state. For this reason, a fixed brightness pattern in which the brightness of the vehicle exterior becomes bright/dark once or the ON state is not needed to remain can be removed from a brightness pattern in which the vehicle exterior becomes bright/dark intermittently. The brightness needs not to be in an intermittent state all the time. As a result, the intermittent state can be reliably estimated at a place where the vehicle light is required to remain switched on.

In accordance with the fourth aspect of the present invention, the setting means sets a waiting mode in which the brightness of the vehicle exterior is estimated to be in an intermittent state on the basis of the number of times for which ON state is set. The setting means sets an intermittent mode on the basis of the number of times for which the ON state is set while in the waiting mode. Accordingly, a fixed brightness pattern in which the brightness of the vehicle exterior becomes bright/dark once or the ON state is not needed to remain can be removed from a brightness pattern in which the vehicle exterior becomes bright/dark intermittently. The brightness needs not to be in an intermittent state all the time. As a result, the intermittent state can be reliably estimated at a place where the vehicle light is required to remain switched on.

In accordance with the fifth aspect of the present invention, since the setting means cancels the waiting mode when the brightness of the vehicle exterior moves to an OFF state due to the variation thereof and a predetermined waiting observation time has passed while in said intermittent mode, the waiting mode is prevented from being maintained so that the brightness of the vehicle exterior can be facilitated to move to an ordinary switching state.

In accordance with the sixth aspect of the present invention, since the setting means cancels the intermittent mode and sets said waiting mode, when the brightness of the vehicle exterior moves to an OFF state due to the variation thereof and a predetermined intermittent waiting observation time has passed while in the intermittent mode, the intermittent mode can be prevented from being maintained continually, the brightness can be facilitated to move to the waiting state in which the vehicle light is not required to remain switched on.

In accordance with the seventh aspect of the present invention, since a discharging light is used as the light source, the number of times of switching on/off of the discharging light can be minimized. As a result, the shortening of the life of the discharging light due to the excessive number of times of switching can be prevented.

BRIEF DESCRIPTION OF THE DRAWINGS

FIG. 2A is an image view which illustrates an ON control of a headlamp and illustrates the outside of a vehicle.

FIG. 2B is the image view which illustrates the switching on control of the headlamp and illustrates the variation of the brightness of a vehicle exterior detected by an illumination sensor.

FIG. 2C is the image view which illustrates the switch on control of the headlamp and illustrates signal properties which switch on/off the head lamp.

FIG. 2D is the image view which illustrates the switching on control of the headlamp and illustrates the change of setting a condition flag.

FIG. 3A is an image view which illustrates the switching off control of a headlamp and illustrates the outside of a vehicle.

FIG. 3B is the image view which illustrates the switching off control of the headlamp and illustrates the variation of the brightness of a vehicle exterior detected by an illumination sensor.

FIG. 3C is the image view which illustrates the switching off control of the headlamp and illustrates signal properties which switch on/off the head lamp.

FIG. 3D is the image view which illustrates the switching off control of the headlamp and illustrates the change of setting a condition flag.

FIG. 3E is the image view which illustrates the switching off control of the headlamp and illustrates the change of setting a condition flag which is different from the condition flag in FIG. 3D.

DESCRIPTION OF THE PREFERRED EMBODIMENTS

With reference to the drawings, an example of an embodiment of the present invention will be explained hereinafter. In the present embodiment, the present invention is applied to a head lump control apparatus for controlling lighting up or lighting off of head lumps which are disposed at the front of a vehicle.

Figure 1:
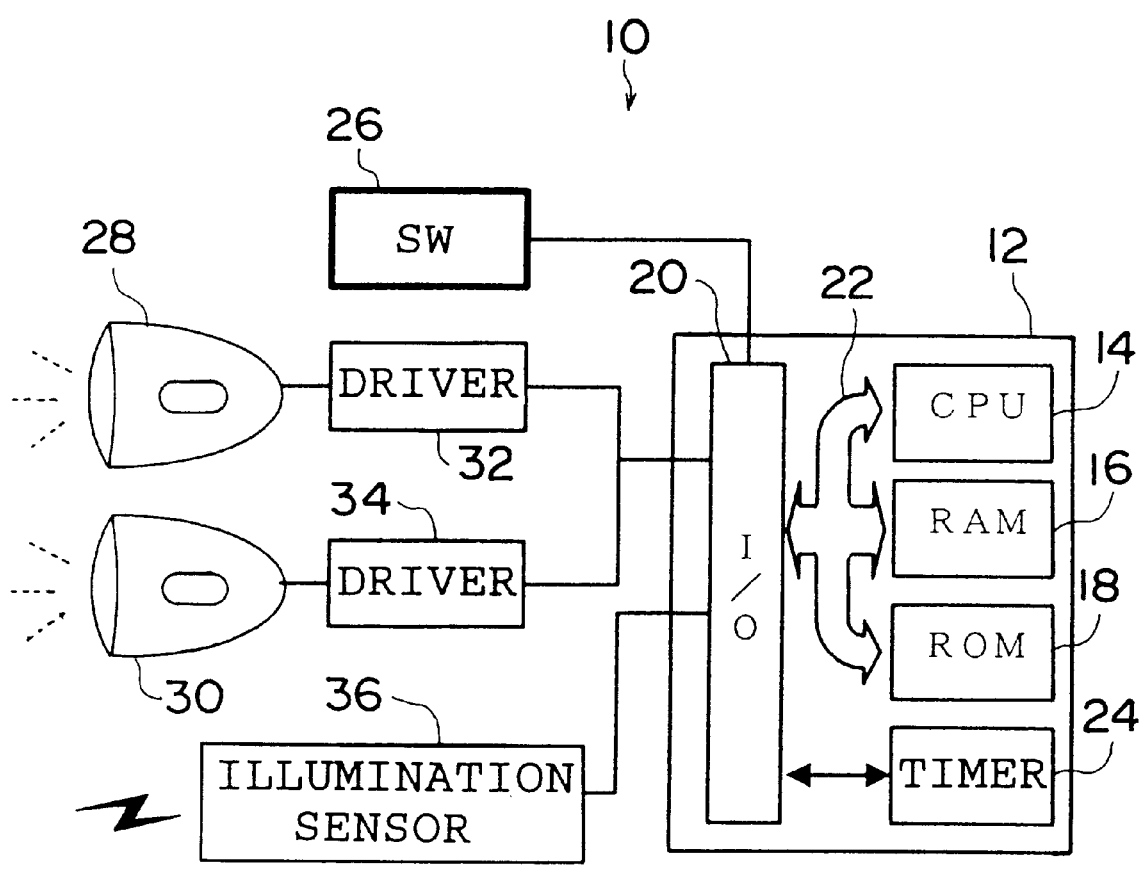
FIG. 1 is a block diagram which illustrates a schematic structure of a headlamp controller to which a vehicle light unit of the present invention can be applied.

As shown in FIG. 1, a headlamp control apparatus 10 has a controller (control circuitry) 12. The controller 12 is structured by a microcomputer which comprises a read only memory (ROM)18, a random access memory (RAM) 16, a central processing unit (CPU)14, and an I/O port 20, and a bus 22 which includes a data bus, a control bus or the like and connect the ROM 18, the RAM 16, the CPU 14, and the I/O port 20. The ROM 18 stores a control program therein for control headlamps which will be described later on. A mobile timer 24 such as a free run counter or the like is connected to the I/O port 20.

An illumination sensor 36 is connected to the I/O port 20, and from the external portion of the controller 12, the illumination sensor 36 meters the illumination of a light control switch (SW) 26, a headlamp 28 which is disposed at the right front side of a vehicle 40 (see FIG. 2A), a headlamp 30 which is disposed at the left front side of the vehicle via drivers 32, and the vehicle exterior. Namely, the illumination sensor 36 outputs the illumination of the vehicle exterior as an electrical signal. The SW 26 which is mounted to the tip end portion of a turn signal lever (not shown) instructs the headlamps 28 and 30 to be switched on/off or to carry out an automatic illumination according to the present embodiment, by rotating the shaft of the lever as a rotation center.

The driver 32 which is connected to the headlamp 28 serves as a driving apparatus for switching the headlamp 28 on/off by a control signal transmitted from the controller 12. The driver 34 which is connected to the headlamp 30 serves as a driving apparatus for switching the headlamp 30 by a control signal transmitted from the controller 12.

Operation of the present embodiment will be explained hereinafter.

With reference to the drawings FIGS. 2A to 2D, a description of a successive illumination estimating control apparatus of the headlamp control apparatus will be given hereinafter. As shown in FIG. 2A, shielding members 42, 44, 46, and 48 of a bridge beam or the like which shield a portion or the whole portion of a transmitted light are installed sequentially so as to be spaced apart from each other at the upper portion of a vehicle 40 in a traveling direction thereof (i.e., a direction indicated by arrow A of FIG. 2A). Accordingly, when the vehicle 40 passes through the shielding members 42 through 48 at the lower portions thereof, a shielding state in which a portion or the whole portion of the transmitted light is shielded and a non-shielding state in which the transmitted light is not shielded are repeated alternatively.

Ordinarily, the outputting signal of the illumination sensor 36 outputs an electric signal representing a voltage or the like in accordance with the illumination of the incident light. However, in the present embodiment, a fixed illumination value S is used as a threshold value, and as shown in FIG. 2B, when the illumination value is equal to or less than the illumination value S, the illumination sensor 36 outputs a low level signal $S_L$. When the illumination value is equal to or more than the illumination value S, the illumination sensor 36 outputs a high level signal $S_H$. This signal corresponds to a brightness pattern. Accordingly, when the low level signal $S_L$ is outputted, the outside of the vehicle 40 can be judged to be dark. When the high level signal $S_H$ is outputted, the outside of the vehicle 40 can be judged to be bright. In FIG. 2B, $t_1$ to $t_8$ correspond to timings each of which is shifted from a shielded state in which a portion or the whole portion of the transmitted light is shielded by the shielding members to an non-shielded state in which a portion or the whole portion of the transmitted light is not shielded by the shielding members, when the vehicle passes beneath the shielding members 42 to 48. Namely, each of the timings $t_1$ to $t_8$ stands for a time when the vehicle enters into a shielded region or when the vehicle enters into a non-shielded region.

In the present embodiment, as shown in FIG. 2C, a predetermined time is set as the time for switching over the lamp on the basis of the signal outputted from the illumination sensor 36 from the time at which a switching on/off signal is outputted from the illumination sensor 36 to the time at which the lamp is switched on/ off. The predetermined time includes a switch-on delay time CHN, a switch-off delay time CTF, a switch-off extension time DFE, and an extension judgment time CPS, for which experimentally determined values are set previously.

The switch-on delay time CHN is a time during which a signal is outputted from the illumination sensor 36 and the lamp is thereby switched on, and is provided so as not to occur any instant switch-on of the lamp at a micro shielded region. The switch-off delay time CTF is a time during which a signal is outputted from the illumination sensor 36 and the lamp is thereby switched off, and is provided so as not to occur any instant switch-off of the lamp at a micro non-shielded region. The switch-off extension time CFE is a time during which the actual switch-off of the lamp is extended at places where the vehicle exterior becomes light/dark intermittently at the lower portion of the bridge beam, or on a road where a plurality of tunnels are successively formed, and is determined previously. The extension identification time CPS is a measurement setting time during which the places where the vehicle exterior becomes bright/dark intermittently are identified, and is previously determined.

In the present embodiment, condition flags are used to express the brightness of the vehicle exterior. The condition flag is comprised of a non-set state which represents an initial state of a vehicle or an ordinary surrounding state of the vehicle (a reset state), Set 1 which represent a waiting state in which it is estimated that the vehicle exterior becomes bright/dark intermittently (a level A state), and Set 2 which represents an intermittent state in which the place where the vehicle is traveling has a high possibility in that the vehicle exterior becomes bright/dark intermittently (a level B).

When the vehicle 40 enters into the lower portion of the shielding member 42 (time $t_1$), because the illumination sensor 36 outputs the low level signal $S_L$, after the switch-on delay time CHN has been passed (time $t_{1A}$), the lamp is switched on. When the vehicle 40 separates from the lower portion of the shielding member 42 while traveling at the lower portion of the shielding member 42 (time $t_2$), because the illumination sensor 36 outputs a high level signal $S_H$, after the switch-off delay time CTF has been passed(time $t_{2A}$), the lamp is switched off. Similarly, when the vehicle 40 enters into the lower portion of the shielding member 44 (time $t_3$), because the illumination sensor 36 outputs the low level signal $S_L$, after the switch-on delay time CHN has been passed (time $t_{3A}$), the lamp is switched on. When the vehicle 40 separates from the lower portion of the shielding member 44 while traveling the lower portion of the same (time $t_4$), because the illumination sensor 36 outputs the low level signal $S_H$, after the switch-off delay time CTF has been passed (time $t_{4A}$), the lamp is switched on.

When a vehicle is entering into the lower portion of the shielding member, namely, in a case in which the time t from the time during which the lamp is switched off so as to correspond to the first separation of the vehicle 40 from the shielding member 42 to the time during which the lamp is switched on so as to correspond to the second separation of the vehicle from the shielding member 44 is less than the extension identification time CPS, as shown in FIG. 2D, a condition flag is changed from a non-set state (a reset state) to Set 1 state (a level A) in which the vehicle exterior is estimated to be bright/dark intermittently. When the condition flag is set to Set 1 (a level A state), and the vehicle enters into the lower portion of the shielding member, the condition flag is changed from the Set 1(the level A state) to the Set 2 (a level B state) in which the place where the vehicle starts to travel may have a high possibility in that the vehicle exterior becomes bright/dark intermittently.

When the condition flag is changed to the Set 2(the state of level B), the time in which the switch-off extension time CFE is added to the switch-off delay time CTF is the time until the lamp is switched off. When the vehicle 40 enters into the lower portion of the shielding member 46 (time $t_5$), the illumination sensor 36 outputs a low level signal ($S_L$), and after the switch-on delay time CHN has been passed (time $t_{5A}$), the lamp is switched on. When the vehicle 40 travels beneath the shielding member 46 and separates from the lower portion thereof (time $t_6$), the illumination sensor 36 outputs the high level signal $S_H$. However, after the switch-off delay time CTF has been passed (time $t_{6A}$), the time until the lamp is switched off (time $t_{6B}$) is extended by a switch-off extension time CFE without switching off the lamp.

During the time which is extended by the switch-off extension time CFE, the vehicle 40 passes through the lower portion of the gap between the shielding members 46 and 48, and enters into the lower portion of the shielding member 48 (time $t_7$) so that the switching-on of the lamp can be maintained.

In this way, it is possible to estimate an intermittent state in which the switching on of the head must be kept on in accordance with the brightness of the vehicle exterior by setting a condition flag. Further, when the vehicle exterior has been estimated to become bright/dark in an intermittent state, because the time until the headlamp is switched off is extended, even when the vehicle passes through a portion where the vehicle exterior becomes bright/dark intermittently, the annoyance being involved with the switch control can be prevented. Moreover, because the switch on/off of the headlamp can be controlled, it is possible to improve the visibility of a driver.

Next, with reference to FIGS. 3A through 3E, a description of the cancellation and the control of the continuous switching of the headlamp control apparatus will be given hereinafter. As shown in FIG. 3A, a terminal shielding member 50 for shielding a portion of the entire portion of the transmitted light from a bridge beam or the like is disposed at the upstream of the vehicle 40 in the traveling direction thereof (a direction indicated by arrow A). After the vehicle 40 has passed through the lower portion of the shielding member 50, the transmitted light is set from a shielded state in which a portion or the entire portion of the light is shielded to a non-shielded state in which a portion or the entire portion of the light is not shielded.

As shown in FIG. 3B, the outputting signal from the illumination sensor 36 is changed from the low level signal $S_L$ to the high level signal $S_H$ at the time where the vehicle 40 separates from the lower portion of the shielding member 50 (time $t_9$).

As shown in FIG. 3D, when the vehicle 40 is passing through the lower portion of the shielding member 50, and the condition flag is in Set 2 state which represents an intermittent state (in the state of level B), as shown in FIG. 3C, the time until the lamp is switched off is extended by the time at which the switch-off extension time CFE is added to the switch-off delay time CTF (intermittent observation time), and at that point of time (time $t_{9B}$), the lamp is switched off. When the lamp is switched off, the condition flag is changed from the Set 2 (level B state) to the Set 1(level A state), after an extension judgment time CPS has been passed, the condition flag is thereby set in an non-set state (reset state).

As shown in FIG. 3E, when the vehicle is passing through the lower portion of the shielding member 50, and the condition flag indicates Set 1 (level A state), the time by which the lamp is switched off is not extended. Accordingly, the lamp is switched off at the point of time when the switch-off delay time CTF (time $t_{9A}$). Further, the condition flag is set in a non-set state (reset state) from the point of time when the switch-off delay time CTF has been passed to the time when the extension judgment time CPS has been passed (time $t_{9D}$)(time $t_9$ to $t_{9D}$: waiting observation time). Thus, the condition flag is changed.

In the above-description, an example in which the condition flag is changed on the basis of the extension judgment time CPS has been explained. However, a time which is different from the extension judgment time CPS can be set as a cancel judgment time.

Figure 4A:
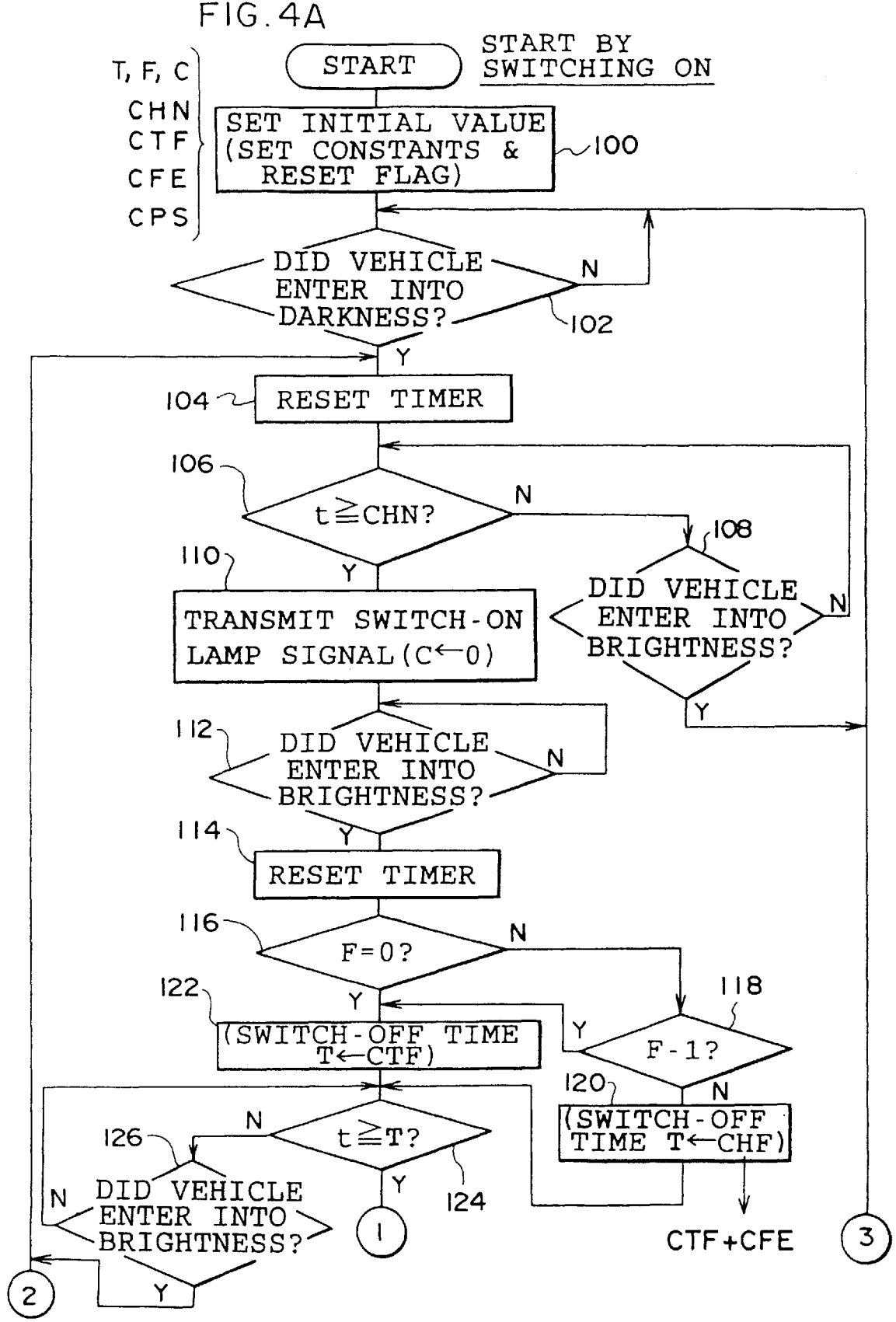
FIGS. 4A and 4B are flowcharts showing a main routine of the switch control according to the present invention.
Figure 4B:
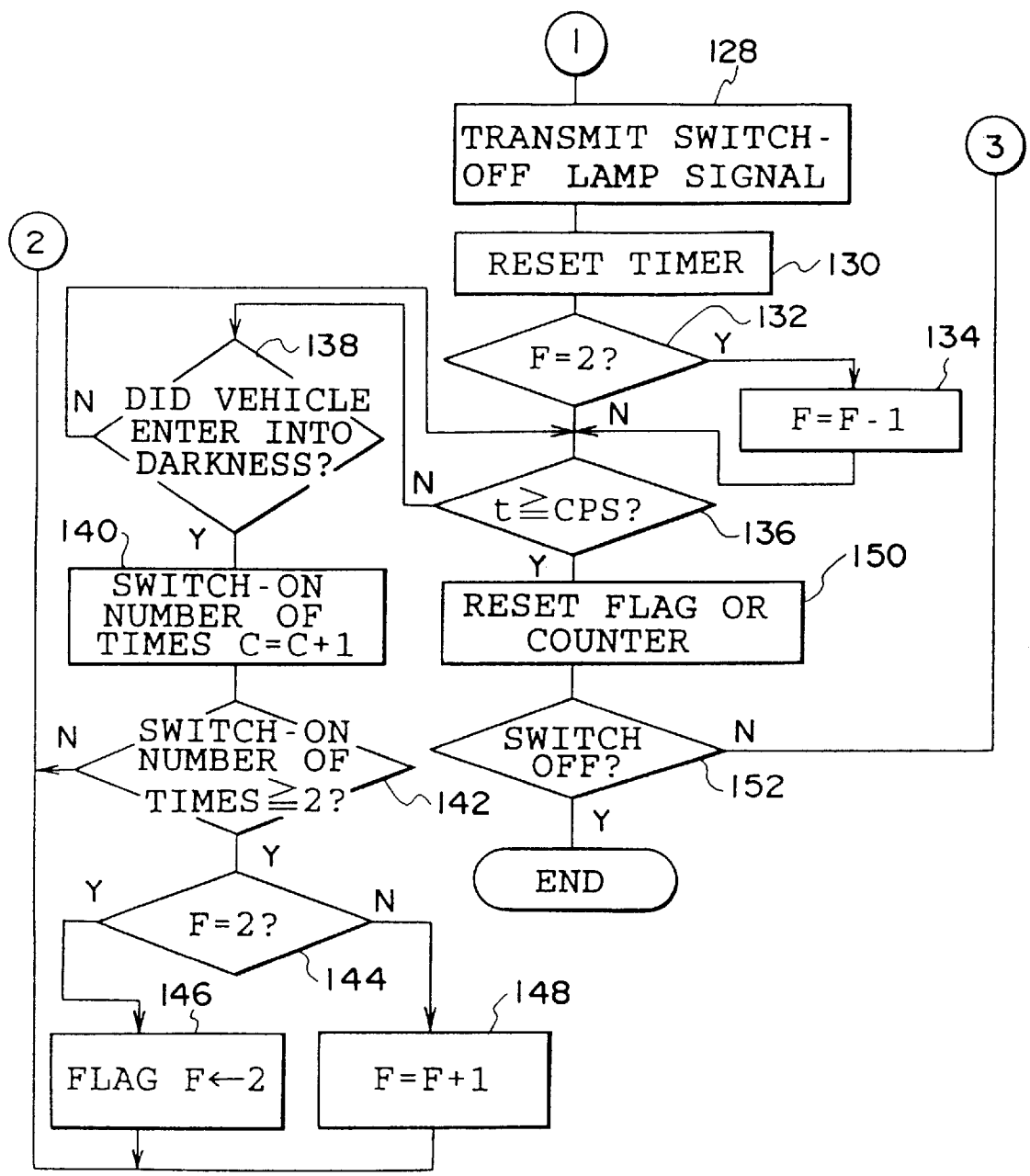

With reference to a flowchart in FIG. 4, a description of the operation of the switch control by a headlamp control apparatus will be given in more detail. When a light control switch 26 is set to an automatic control, and the automatic control is thereby instructed, an illumination control routine which is shown in FIG. 4A and FIG. 4B is effected repeatedly.

In Step 100, an initial setting is carried out. Namely, as described above, constants for the switch-on delay time CHN, the switch-off delay time CTF, the switch-off extension time CFE, and the extension judgment time CPS are set. The condition flag, a counter C, an a metering time t, T are reset. The counter C is a variable in order to count the switch-on frequency which will be described later. Further, the metering time t is a variable for metering the above-described switch-on delay time CHN. The metering time T is a variable for metering the above-described switch-off delay time CTF, and the switch-off extension time CFE.

In Step 102, it is judged whether or not the signal outputted by the illumination sensor 36 is equal to or more than a predetermined value, i.e., a predetermined illumination value. Due to the judgment, it is thereby judged whether or not a vehicle has entered into the shaded portion. When the illumination value is more than a predetermined value, the answer in Step 102 is "No", and the judgment of the illumination value by the illumination sensor 36 is carried out again, and when the illumination is less than a predetermined value, the answer in Step 102 is "Yes". Next, in Step 104, the timer 24 is reset.

Next, in Step 106, it is judged whether or not the time t which is indicated by the timer 24 is t≧CHN. Namely, it is judged whether the switch-on delay time CHN has been passed. When the switch-on delay time CHN has been judged to have elapsed, and the answer in Step 106 is "Yes". The routine proceeds to Step 110, where a lamp switch-on signal is transmitted to the drivers 32 and 34. Accordingly, the headlamps 28 and 30 are switched on. On the other hand, when the time t which is indicated by the timer 24 is t≦CHN, the answer in Step 106 is "No". The routine proceeds to Step 108, where is judged whether or not the signal outputted by the illumination sensor 36 is more than a predetermined value (a predetermined illumination value). Namely, it is thereby judged whether or not the vehicle has entered into the lighted portion. When the vehicle has entered into the lighted portion, the answer in Step 108 is "Yes". The routine thereby returns to Step 102 without transmitting "switch on lamp" signal. When the vehicle has not entered into the lighted portion, the answer in Step 108 is "No", and the routine returns to Step 106.

In Step 112, it is judged whether or not the signal outputted from the illumination sensor 36 is more than a predetermined value (a predetermined illumination value). Namely, it is judged whether or not the vehicle has entered into the lighted portion. When the vehicle does not enter into the lighted portion, the judgment in Step 112 is negative, and the illumination value outputted from the illumination sensor is judged once more. When the illumination value is more than the predetermined value, the judgment in Step 112 is affirmative. And in Step 114, the timer 24 is reset.

In Step 116, it is judged whether or not the condition flag F is non-set (F=0). When the judgment is affirmative, the routine proceeds to Step 122, where the switch-off delay time CTF is set for the switch-off time T, and thereafter, the routine goes to Step 124. On the other hand, in Step 116, when the judgment is negative, the routine proceeds to Step 118, where it is judged whether or not the condition flag corresponds to Set 1. When the condition flag is Set 1, the routine goes to Step 122. When the condition flag is Set 2, in Step 120, a time CHF (=the switch-off delay time CTF+ the switch-off extension time CFE) is set for a switch-off time T. Namely, when the condition flag F is non-set or corresponds to Set 1, the switch-off delay time CTF is set for the switched off time T, and when the condition flag is Set 2, the sum of the switch-off delay time CTF and the switch-off extension time CFE is set for the switch-off time T.

In Step 124, it is judged whether or not the switch-off time T has been passed by judging whether or not the time t (indicated by the timer 24)≧the switch off time T. When it is judged that the switch-off time T has been passed, the answer is affirmative in Step 124. In Step 128, switch-off lamp signal is transmitted to the drivers 32 and 34. Accordingly, the headlamps are switched off. When the time t (indicated by the timer 24) is less than the switch-off time T, the answer is negative in Step 124. In Step 126, it is judged whether or not the illumination value from the illumination sensor 36 is equal to or less than a predetermined illumination value. Namely, it is judged whether or not the vehicle has entered into the shaded portion. When the vehicle has entered into the shaded portion, the answer in Step 126 is "Yes". The routine returns to Step 194 without outputting a switch off lam signal. In Step 126, when it has been judged that the vehicle has not entered into the shaded portion (negative judgment), the routine returns to Step 124.

In Step 128, after the lamp switch-off signal has been outputted, in Step 130, the timer 24 is reset. In Step 134, the condition flag is changed to Set 1 (F=F−1), and the routine proceeds to Step 136. On the other hand when the condition flag corresponds to the states except for Set 2, the answer is negative in Step 132, and the routine proceeds to Step 136.

In Step 136, it is judged whether or not the extension judgment time CPS has been passed by judging whether or not the time t≧CPS. When it is judged that the extension judgment time CPS has been passed, the answer is affirmative in Step 136. In Step 150, the condition flag F and the counter C are reset, and the routine proceeds to Step 152. In Step 152, it is judged whether or not a SW(switch) 26 is switched off. When the SW26 is switched on, the routine returns to Step 102, and when it is switched off, the present routine is terminated.

When it is judged that the time t has been passed by the extension judgment time CPS, the answer is negative in Step 136. In Step 138, it is judged whether or not the illumination value by the illumination sensor 36. Accordingly, it is thereby judged whether or not the vehicle has entered into the shaded portion. When the vehicle has entered into the shaded portion, the answer is affirmative in Step 138, and the routine proceeds to Step 140. On the other hand, when the switch-on frequency is equal to or more than twice, in Step 142, the answer is "Yes", and the routine proceeds to Step 144.

In Step 144, it is judged whether or not the condition flag is Set 2 (F=2). When the judgment is affirmative, in Step 146, the condition flag is remained as it is. The routine returns to Step 104. Meanwhile, when the answer is negative in Step 144, because the condition flag is non-set or is Set 1, the level is increased by one (F=F+1). Thereafter, the routine returns to Step 104.

In this way, in the present embodiment, on the basis of the brightness (illumination) of the outside of the vehicle, in a case in which a plurality of states in which the headlamp is switched on in a relatively short time after the headlamp has been switched-off have occurred, the switch-off time of the headlamp is extended by estimating that the shading is carried out intermittently. For this reason, even when the vehicle passes through the lower portion or the like of a bridge beam where the vehicle exterior becomes bright/dark intermittently, the switching over of the headlamp is not needed, and the headlamp can remain switched on. As a result, the deterioration of the visibility for a driver can be prevented.

In the present embodiment, the present invention is applied to the control of the switching on/off of the headlamp. However, the present invention is not limited to this, and it can be applied to a lighting unit for illuminating tail lamps or meters.

In the present embodiment, the case in which the present invention is shifted from an ordinary state to two states including a waiting state and an intermittent state has been described. However, the present invention is not limited to this, and can be shifted to three states or more.

Further, in the present embodiment, a case in which the switching-off of the headlamp has been described. However, it is possible to change the state of the lamp by degrees in such a manner that, for example, the small lamp can be switched on or the whole lamps can be switched on.

In the present embodiment, on the basis of a predetermined illumination value, the setting of the lamp has been classified into the ON state and the OFF state. However, the present invention is not limited to this, and can be sorted into a plurality of states on the basis of a plurality of the illumination values.

In the present embodiment, a case in which illumination value is obtained from the illumination sensor has been explained. However, the present invention is not limited to this. The control of switching on/off can be effected on the basis of the information from a communication device or other devices. For example, the judgment of the brightness pattern which is formed by alternating a shielded state and a non-shielded state, i.e., the standard for changing the condition flag or setting the extension time can be carried out.

Preferably, the present invention can be employed for a discharge light such as a metal halide lamp, a xenon lamp or the like. Especially, in a high intensity discharge (HID) lamp, when the number of times of ON/OFF operation increases, the life is shortened. Accordingly, as described in the present embodiment, when the continuous switching on of the lamp is enabled, it is possible to prolong the life of the lamp, and because the number of times of ON/OFF operation decreases, the visibility of the driver can be improved.

What is claimed is:

1. A vehicle lighting unit, comprising:
   detecting means which detects the brightness of the exterior of a vehicle; and
   a vehicle light which is mounted to said vehicle, and has a light source for illuminating at least one of the interior and the exterior of said vehicle;
   switching control means which switches on said vehicle light when said detected brightness of the vehicle exterior is equal to or less than a predetermined value, and which switches off said vehicle light when said detected brightness of the vehicle exterior is more than said predetermined value;
   estimating means which estimates whether or not the brightness of the exterior of the vehicle which starts to travel is in an intermittent state, thereby requiring said vehicle light to remain switched on, on the basis of the variation of said detected brightness of the vehicle exterior; and
   prohibiting means which prohibits said vehicle light from being switched off, when the brightness of said vehicle exterior has been estimated to be in said intermittent state by said estimating means.

2. A vehicle lighting unit according to claim 1, wherein, when the brightness of said vehicle exterior has been estimated not to be in said intermittent state by said estimating means, said prohibiting means cancels the prohibition of the switching off of said vehicle light.

3. A vehicle lighting unit according to claim 1, wherein an ON state in which said vehicle light is switched on when said detected brightness of the vehicle exterior is equal to or less than a predetermined value, and an OFF state in which said vehicle light is switched off when said detected brightness of the vehicle exterior is more than a predetermined value are continually alternating so that the brightness pattern thereof is thereby determined in advance, and said estimating means estimates whether or not the brightness of the vehicle exterior is in said intermittent state on the basis of the predetermined brightness pattern.

4. A vehicle light unit according to claim 3, wherein said estimating means estimates whether or not the brightness of the vehicle exterior is in said intermittent state by comparing the brightness pattern resulting from said detected brightness of the vehicle exterior to said predetermined brightness pattern.

5. A vehicle lighting unit according to claim 3, wherein said estimating means includes:

setting means which sets a waiting mode in which the brightness of the vehicle exterior is estimated to be in said intermittent state, when the brightness of the vehicle exterior has a pattern in which said ON state is set for the first number of times or more within a predetermined time, and while said waiting mode is being set, which sets an intermittent mode when the brightness of the vehicle exterior has a pattern in which said ON state is set for the second number of times or more within a predetermined time, so that said estimating means estimates the brightness of the vehicle exterior to be in said intermittent state when an intermittent mode has been set by said setting means.

6. A vehicle lighting unit according to claim 5, wherein said setting means cancels said waiting mode when the brightness of the vehicle exterior moves to an OFF state due to the variation thereof and a predetermined waiting observation time has passed while in said waiting mode.

7. A vehicle lighting unit according to claim 5, wherein said setting means cancels said intermittent mode and sets said waiting mode, when the brightness of the vehicle exterior moves to an OFF state due to the variation thereof and a predetermined intermittent waiting observation time has passed while in said intermittent mode.

8. A vehicle lighting unit according to claim 5, wherein said setting means sets said waiting mode or said intermittent mode by setting or resetting a condition flag.

9. A vehicle lighting unit according to claim 1, wherein said light source is a discharging light.

10. A vehicle lighting unit according to claim 1, wherein said switching control means switches on/off the vehicle light in such a manner that the vehicle light is switched on after the switch on time has been passed from the time when said detected brightness of the vehicle exterior is equal to or less than a predetermined value, and the vehicle light is switched off after the switch off time has been passed from the time when said detected brightness of the vehicle exterior is more than a predetermined value.

11. A vehicle lighting unit, comprising:

detecting means which detects the brightness of the exterior of a vehicle;

a vehicle light which is mounted to said vehicle, and has a light source for illuminating at least one of the interior and the exterior of said vehicle; and a control circuit which effects a switching control process which switches on said vehicle light when said detected brightness of the vehicle exterior is equal to or less than a predetermined value, and switches off said vehicle light when the brightness of the vehicle exterior is more than a predetermined value; an estimating process which estimates whether or not the brightness of the exterior of the vehicle which starts to travel is in an intermittent state thereby requiring said vehicle light to remain switched on, on the basis of the variation of said detected brightness of the vehicle exterior; and a prohibiting process which prohibits said vehicle light from being switched off when the brightness of said vehicle exterior has been estimated to be in said intermittent state by said estimating process.

12. A vehicle lighting unit according to claim 11, wherein said prohibiting process cancels the prohibition of the switching off of said vehicle light when the brightness of the vehicle exterior has been estimated not to be in an intermittent state by said estimating means.

13. A vehicle lighting unit according to claim 11, wherein said estimating process determines in advance a brightness pattern in which an ON state in which said vehicle light is switched on when said detected brightness of the vehicle exterior is equal to or less than a predetermined value, and an OFF state in which said vehicle light is switched off when said detected brightness of the vehicle exterior is more than a predetermined value are continually alternating, and estimates whether or not the brightness of the vehicle exterior is in said intermittent state on the basis of said predetermined brightness pattern.

14. A vehicle lighting unit according to claim 13, wherein said estimating process estimates whether or not the brightness of the vehicle exterior is in said intermittent state by comparing the brightness pattern resulting from said detected brightness of the vehicle exterior to said predetermined brightness pattern.

15. A vehicle lighting unit according to claim 13, wherein said estimating process includes: a setting process which sets a waiting mode in which the brightness of the vehicle exterior is estimated to be in said intermittent state, when the brightness of the vehicle exterior has a pattern in which said ON state is set for the first number of times or more within a predetermined time, and while said waiting mode is being set, which sets an intermittent mode when the brightness of the vehicle exterior has a pattern in which said ON state is set for the second number of times or more within a predetermined time, so that said estimating process estimates the brightness of the vehicle exterior to be in said intermittent state when an intermittent mode has been set by said setting process.

16. A vehicle lighting unit according to claim 15, wherein said setting process cancels said waiting mode when the brightness of the vehicle exterior moves to an OFF state due to the variation thereof and a predetermined waiting observation time has passed while in said waiting mode.

17. A vehicle lighting unit according to claim 15, wherein said setting process cancels said intermittent mode and sets said waiting mode, when the brightness of the vehicle exterior moves to an OFF state due to the variation thereof and a predetermined intermittent waiting observation time has passed while in said intermittent mode.

18. A vehicle lighting unit according to claim 15, wherein said setting process sets said waiting mode or said intermittent mode by setting or resetting a condition flag.

19. A vehicle lighting unit according to claim 11, wherein said light source is a discharging light.

20. A vehicle lighting unit according to claim 11, wherein said switching control process switches on/off the vehicle light in such a manner that the vehicle light is switched on after the switch on time has been passed from the time when said detected brightness of the vehicle exterior is equal to or less than a predetermined value, and the vehicle light is switched off after the switch off time has been passed from the time when said detected brightness of the vehicle exterior is more than a predetermined value.

* * * * *